Aug. 20, 1929.  P. S. HEASLIP  1,725,636
FISHING LURE
Filed Aug. 8, 1928
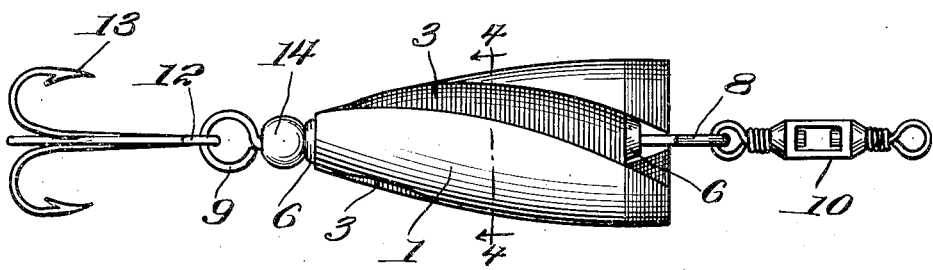
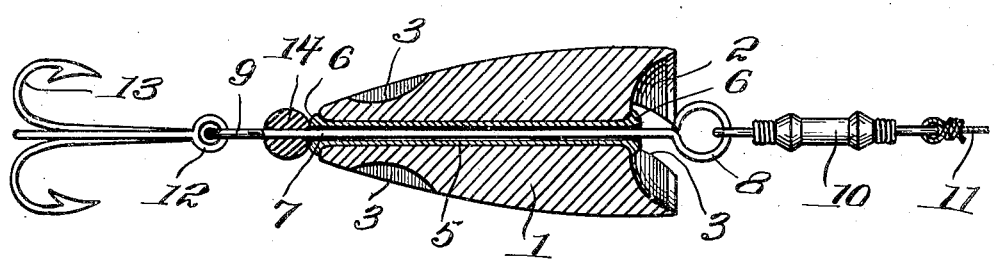
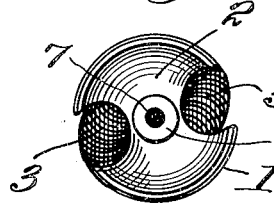 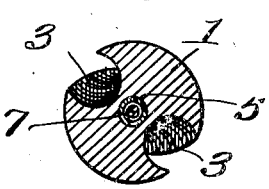 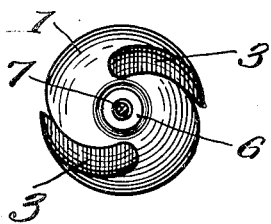
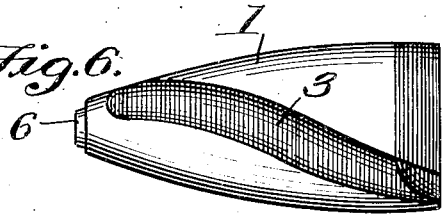
Porter S. Heaslip
INVENTOR
BY Victor J. Evans
ATTORNEY
WITNESS: J. T. L. Wright Patented Aug. 20, 1929.

1,725,636

UNITED STATES PATENT OFFICE.

PORTER S. HEASLIP, OF MARINE CITY, MICHIGAN.

FISHING LURE.

Application filed August 8, 1928. Serial No. 298,268.

My present invention has reference to an improved artificial bait, my primary object being the provision of an artificial lure or minnow adapted for either casting, trolling or still fishing, whose body, when drawn through the water, will rapidly revolve on the shaft or stem to which the hooks are connected in a substantially horizontal plane and thereby made attractive to the fish.

Another object is the provision of an artificial bait in which the hooks are less liable to become entangled in the weeds or to catch in other obstructions, thus saving much time and annoyance and increasing the chances of success.

A still further object is the provision of an artificial bait whose body is in the nature of a cone-shaped element of any desired material, whose outer end is concaved, and whose sides are formed with arcuate concavities providing grooves from the said concavities to the outer or reduced end thereof, said body having a sleeve centrally and longitudinally arranged therein, for the passage of a wire rod having both of its ends provided with eyes, one of said eyes engaging with the hooks and the other being connected with a swivel to which the line is connected, while slidable on the rod between the reduced end of the body and eye on the said rod, there is a spherical member that provides an anti-frictional element between the body and the eye.

To the attainment of the foregoing the invention consists in the improvement as hereinafter described and definitely claimed.

In the drawings:

Figure 1 is a side elevation of an artificial bait in accordance with this invention.

Figure 2 is a substantially central longitudinal sectional view therethrough.

Figure 3 is a front elevation looking toward the body of the bait.

Figure 4 is a sectional view approximately on the line 4—4 of Figure 1.

Figure 5 is an end view looking toward the rear of the body.

Figure 6 is a side elevation of the body.

As disclosed by the drawings, the body 1 of my improved artificial bait is substantially cone-shaped. The front and widened end of the body is concaved, as at 2, and the sides of the body on the outer surface thereof are provided with curved grooves 3 that terminate adjacent to the rear and reduced end of the body. The inner walls of these grooves are curved. The walls of the grooves are colored differently from the sides of the body. This is to attract the attention of the fish.

Passing centrally through an opening in the body is a sleeve 5. The sleeve has both of its ends headed, as at 6. The sleeve provides a guide for a rod 7 that is of a greater length than the body 1 and has both of its ends provided with eyes 8 and 9, respectively. Connected to the eye 8, at the front of the bait is a swivel 10, and this swivel has secured to its outer end the fishing line 11. Connected to the eye 9 there is the eye end 12 of the shanks of the hooks 13 of the bait. Slidable on the rod 7 between the eye 9 and the reduced end of the body 1, there is a sphere 14. This sphere provides an anti-frictional bearing between the eye 9 and the reduced end of the body 1. When my bait is cast in the water, and is drawn by the fisherman, the rod carrying the hooks, incident to the swivel connection 10 between the said rod and the line 11, moves freely through the sleeve and the body 1, giving the said body 1 more freedom and thereby preventing the tangling of the hooks when the bait meets obstructions in the water such as weeds, etc. When drawn in the water a comparatively large volume of such water will proceed to the cup-shaped mouth portion 2 of the body 1 and will be directed therefrom through the grooves 3.

It should have been stated that these grooves or channels 3 are oppositely directed, the water passing therethrough and causing a rapid turning of the body on the rod and as the body 1 is differently colored the rapidly turning or revolving body will readily attract the fish. The body can be made either of wood or light metal and is freely moved with respect to both the lines and the hooks.

Having described the invention, I claim:

1. An artificial bait including a substantially cone-shaped body having its widened end formed with a cup-shaped depression and its outer face formed with oppositely disposed longitudinal grooves between the said concaved end and the reduced end of the body, and the grooves being differently colored from that of the body, a rod centrally and slidably received through the body and of a greater length than the said body, said rod having its opposite ends formed with eyes, hooks designed to be attached to the eye of the rod adjacent the reduced end of the body, and a line swivelly connected to the second eye.

2. An artificial bait including a substantially conical body, of wood, light metal or the like, said body having its widened end formed with a cup-shaped depression and its sides formed with oppositely curved grooves which terminate at or adjacent to the reduced end of the body, a bearing sleeve passing centrally through the body and having its opposite ends headed, a rod of a greater length than the body freely guided through the bearing sleeve, said rod having its opposite ends rounded to provide eyes, a spherical member on the rod at the reduced end of the body, the eye of the rod adjacent the spherical member designed to have hooks attached thereto, the second eye designed to be connected to a swivel and the said swivel in turn designed to have connected thereto a fishing line.

In testimony whereof I affix my signature.

PORTER S. HEASLIP.